US007840050B2

United States Patent
Ramamurthy et al.

(10) Patent No.: US 7,840,050 B2
(45) Date of Patent: *Nov. 23, 2010

(54) SYSTEM AND METHOD FOR PIECEWISE REGISTRATION OF TIMEPOINTS

(75) Inventors: Venkat Raghavan Ramamurthy, Yardley, PA (US); Christian Beldinger, Algonquin, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1089 days.

This patent is subject to a terminal disclaimer.

(21) Appl. No.: 11/417,810

(22) Filed: May 3, 2006

(65) Prior Publication Data

US 2007/0014456 A1 Jan. 18, 2007

Related U.S. Application Data

(60) Provisional application No. 60/678,158, filed on May 5, 2005.

(51) Int. Cl.
*G06K 9/36* (2006.01)
(52) U.S. Cl. .................................. 382/131; 382/294
(58) Field of Classification Search .............. 378/4, 378/8, 15, 19, 62, 63, 901; 600/407; 715/764, 715/776, 777, 779; 128/922; 382/128, 131, 382/132, 294
See application file for complete search history.

(56) References Cited

U.S. PATENT DOCUMENTS

2006/0025669 A1* 2/2006 Ramamurthy et al. ........ 600/407
2006/0030768 A1* 2/2006 Ramamurthy et al. ........ 600/407

OTHER PUBLICATIONS

Tsui et al., "Analyzing Multi-Modality tomographic images and associated regions of interest with MIDAS", Proceedings of the SPIE, SPIE, Bellingham, VA, US, vol. 4322, No. Part 1-3, Feb. 19, 2001, pp. 1725-1734.
Maintz et al, "A Survey of Medical Image Registration" Medical Image Analysis, Oxford University Press, Oxford, GB vol. 2, No. 1, Mar. 1998, pp. 1-37.
Rui et al., "An overview of medical image registration", Computational Intelligence and Multimedia Applications, 2003. Proceedings Fifth International Conference on Sep. 27-30, 2003, Piscataway, NJ, USA, IEEE, Sep. 27, 2003, pp. 385-390.
Fookes et al., Institute of Electrical and Electronics Engineers, "The use of mutual information for rigid medical image registration : a review", IEEE 2002 International Conference on Systems, Man and Cybernetics. Yasmine, Hammamet, Tunesia, Oct. 6-9, 2002. vol. 7 of 7, Oct. 6, 2002 pp. 689-694.

* cited by examiner

*Primary Examiner*—Brian Casler
*Assistant Examiner*—Elmer Chao (57) ABSTRACT

A system and method for piecewise registration of timepoints are provided. The method comprises: selecting an image dataset of a first or second timepoint to be registered; defining a sub-volume in the selected image dataset; and registering the sub-volume with a whole-volume of the unselected image dataset.

23 Claims, 10 Drawing Sheets

SYSTEM AND METHOD FOR PIECEWISE REGISTRATION OF TIMEPOINTS

CROSS-REFERENCE TO RELATED APPLICATION

This application claims the benefit of U.S. Provisional Application No. 60/678,158, filed May 5, 2005, a copy of which is herein incorporated by reference.

BACKGROUND OF THE INVENTION

1. Technical Field

The present invention relates to medical image analysis, and more particularly, to a system and method for piecewise registration of timepoints for analysis of disease progression or response to therapy.

2. Discussion of the Related Art

Functional imaging using single photon emission computed tomography (SPECT) and positron emission tomography (PET) is extremely valuable in the diagnosis of various medical disorders. However, uncertainty in the anatomic definition on SPECT and PET images sometimes limits their usefulness. To overcome this, a combination of magnetic resonance images (MRI) and X-ray computed tomography (CT) images with functional SPECT or PET images of the same sections of the body is sometimes used. This provides complementary anatomic (MRI or CT) and physiological (SPECT or PET) information that is of great importance to research, diagnosis and treatment.

Functional body images and structural images are two types of medical images used by medical practitioners for the diagnosis of certain medical disorders. Functional body images such as those derived from SPECT or PET scans, provide physiological information, whereas structural images such as those derived from CT or MRI, provide an anatomic map of the body. Different medical imaging techniques may provide scans with complementary and occasionally conflicting information. For example, the combination of such images (via image fusion or image registration) using picture archiving communications systems (PACS) can often lead to additional clinical information not apparent in the separate images. Thus, by imposing a structural anatomic framework on a set of functional images, the position of a tumor or other lesion in a later functional image may be determined even where there is insufficient anatomic detail.

Although the construction of a composite, overlapping medical image with image registration has been primarily used in the fusion of functional and anatomical images, it has also been applied to a series of the same modality of images. Examples of this are registration of SPECT images of the same subject in follow-up studies or in a comparison of an image with normal uptake properties to an image with suspected abnormalities. In addition, image registration of SPECT and PET images and the registration of SPECT and PET images with anatomic atlases provide an important means to evaluate comparative uptake properties of SPECT and PET radiopharmaceuticals, and to correlate uptake properties with anatomy.

Multi-modal medical image registration is fast becoming a visualization tool that can significantly aid in the early detection of tumors and other diseases and in improving the accuracy of diagnosis. For example, radiologists often have difficulty locating and accurately identifying cancer tissue, even with the aid of structural information such as CT and MRI because of the low contrast between the cancer and the surrounding tissues in CT and MRI images. However, by using SPECT and radioactively labeled monoclonal antibodies it is possible to obtain high contrast images of the concentration of antibodies in tumors.

It is thus becoming increasingly desirable to combine the outputs and strengths of multiple medical imaging systems. However, certain drawbacks exist due to combining different file structures, the transfer and networking thereof and registration and visualization of the composite images. For example, such systems generally do not support more than a few combinations of datasets from different modalities. In addition, many systems do not provide a quick and accurate means for analyzing changes in tumors. Further, many systems do not provide a quick technique for aligning medical images from different timepoints so that images of the same modality that were scanned at different timepoints can be compared.

Accordingly, there is a need for a technique that enables medical practitioners to compare patient scans taken at a different times using the same or different modalities so that medical practitioners can make better-informed diagnostic, therapeutic and follow-up decisions in a cost-effective and efficient manner.

SUMMARY OF THE INVENTION

In one embodiment of the present invention, a method for piecewise registration of timepoints comprises: selecting an image dataset of a first or second timepoint to be registered; defining a sub-volume in the selected image dataset; and registering the sub-volume with a whole-volume of the unselected image dataset.

The image datasets of the first and second timepoints each comprise data acquired using a computed tomography (CT), positron emission tomography (PET), single photon emission computed tomography (SPECT), magnetic resonance (MR) or ultrasound technique.

The image datasets of the first and second timepoints each comprise a CT image series and MR image series, a PET image series and SPECT image series, a CT and PET image series, an MR and PET image series, a CT and SPECT image series, an MR and SPECT image series or an ultrasound image series.

The method further comprises loading the image dataset of each of the first and second timepoints. Loading the image dataset of each of the first and second timepoints comprises: selecting an image dataset of the timepoint; and constructing a volume based on the image dataset of the timepoint.

The method further comprises registering the image dataset of each of the first and second timepoints. Registering the image dataset of each of the first and second timepoints comprises: registering a first image series with a second image series of the image dataset of the first timepoint; registering a first image series with a second image series of the image dataset of the second timepoint; and registering the first image series of the first timepoint with the first image series of the second timepoint and the second image series of the first timepoint with the second image series of the second timepoint.

The method further comprises displaying the image datasets of the first and second timepoints before selecting the image dataset to be registered. The image dataset of the first or second timepoint to be registered is automatically or manually selected. The method further comprises displaying the image dataset selected to be registered before defining the sub-volume on the selected image dataset. The sub-volume is manually defined.

Registering the sub-volume and the whole-volume of the unselected image dataset comprises: registering a whole-volume including the sub-volume of a first image series with a whole-volume of a second image series of the selected image dataset; registering a whole-volume of a first image series with a whole-volume of a second image series of the unselected image dataset; and registering the whole-volume including the sub-volume of the first image series of the selected image dataset with the whole-volume of the first image series of the unselected image dataset and the whole-volume of the second image series of the selected image dataset with the whole-volume of the second image series of the unselected image dataset.

The method further comprises displaying the registered sub-volume and whole-volume of the unselected image dataset.

In another embodiment of the present invention, a system for piecewise registration of timepoints comprises: a memory device for storing a program; a processor in communication with the memory device, the processor operative with the program to: receive a selection of an image dataset of a first or second timepoint to be registered; receive an input defining a sub-volume in the selected image dataset; and register the sub-volume with a whole-volume of the unselected image dataset.

The image datasets of the first and second timepoints each comprise data acquired using a CT, PET, SPECT, MR or ultrasound device. The image datasets of the first and second timepoints each comprise a CT image series and MR image series, a PET image series and SPECT image series, a CT and PET image series, an MR and PET image series, a CT and SPECT image series, an MR and SPECT image series or an ultrasound image series.

The processor is further operative with the program code to load the image dataset of each of the first and second timepoints. When loading the image dataset of each of the first and second timepoints the processor is further operative with the program code to: receive a selection of an image dataset of the timepoint; and construct a volume based on the image dataset of the timepoint.

The processor is further operative with the program code to register the image dataset of each of the first and second timepoints. When registering the image dataset of each of the first and second timepoints the processor is further operative with the program code to: register a first image series with a second image series of the image dataset of the first timepoint; register a first image series with a second image series of the image dataset of the second timepoint; and register the first image series of the first timepoint with the first image series of the second timepoint and the second image series of the first timepoint with the second image series of the second timepoint.

The processor is further operative with the program code to display the image datasets of the first and second timepoints before the image dataset to be registered is selected. The processor is further operative with the program code to display the image dataset selected to be registered before defining the sub-volume on the selected image dataset.

When registering the sub-volume and the whole-volume of the unselected image dataset the processor is further operative with the program code to: register a whole-volume including the sub-volume of a first image series with a whole-volume of a second image series of the selected image dataset; register a whole-volume of a first image series with a whole-volume of a second image series of the unselected image dataset; and register the whole-volume including the sub-volume of the first image series of the selected image dataset with the whole-volume of the first image series of the unselected image dataset and the whole-volume of the second image series of the selected image dataset with the whole-volume of the second image series of the unselected image dataset.

The processor is further operative with the program code to display the registered sub-volume and whole-volume of the unselected image dataset.

In yet another embodiment of the present invention, a method for local volume registration of timepoints comprises: selecting image datasets of first and second timepoints; loading the image datasets of the first and second timepoints; registering the image datasets of the first and second timepoints; displaying the image datasets of the first and second timepoints; selecting one of the displayed image datasets on which to define a sub-volume; displaying the image dataset on which to define the sub-volume; defining the sub-volume in the displayed image dataset; and registering the sub-volume with a whole-volume of the image dataset on which the sub-volume was not defined. The sub-volume is an organ.

Registering the sub-volume with a whole-volume of the image dataset on which the sub-volume was not defined comprises: registering the sub-volume of a first image series with a whole-volume of a second image series of the image dataset on which the sub-volume was defined; registering a whole-volume of a first image series with a whole-volume of a second image series of the image dataset on which the sub-volume was not defined; and registering the sub-volume of the first image series of the image dataset on which the sub-volume was defined with the whole-volume of the first image series of the image dataset on which the sub-volume was not defined and the whole-volume of the second image series of the image dataset on which the sub-volume was defined with the whole-volume of the second image series of the image dataset on which the sub-volume was not defined.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Exemplary embodiments of the present invention are directed to a multi-modality application that allows the comparison of two or more studies to each other. This is done by comparing an initial diagnosis with a follow-up scan after treatment. For example, the present invention can be used in oncology cases where one or several follow-up studies are performed to evaluate disease progression or response to therapy. The present invention can also be applied in medical modalities where change detection can be used to detect lesions, tumors, cancers, etc.

The present invention can be used in the following exemplary areas of medical imaging: therapy response monitoring by performing change detection using computed tomography (CT) or Magnetic Resonance (MR) images—positron emission tomography (PET) or CT—single photon emission computed tomography (SPECT) over time; bone cancer detection by performing bone segmentation and lesion detection; liver cancer detection using perfusion and spectroscopy; breast cancer detection combining perfusion and spectroscopy and characterizing benign or malignant tumors; and neurology by using semi-automatic and automatic tools for volumetry of brain structures like hippocampal volumes.

Modalities for use with the present invention are, for example: static attenuation corrected (AC) PET, static non-attenuation corrected (NAC) PET and respiratory-gated PET; static AC SPECT or nuclear medicine (NM) and static NAC SPECT or NM; high-resolution CT, low-resolution CT, spiral CT and respiratory-gated CT; high-resolution magnetic resonance (MR) images; and ultrasound. The present invention can load gantry-titled datasets. In addition, the present invention is capable of accepting an image series containing unequally spaced slices or an image series containing overlapping slices. Further, the present invention is capable of registering planar SPECT datasets with CT datasets.

The present invention can further load static AC PET or static NAC PET datasets fused together with corresponding registered CT datasets from one patient study, acquired via a PET/CT scanner or on separate devices. In addition, static AC SPECT or static NAC SPECT datasets fused together with corresponding registered CT datasets from one patient study, acquired via a SPECT/CT scanner or on separate devices may be loaded. Further, two series of the same modality type may be loaded and displayed fused within a single timepoint. For example, the present invention can allow a CT dataset fused together with another CT dataset where both datasets were acquired via the same CT scanner or different devices.

Figure 1:
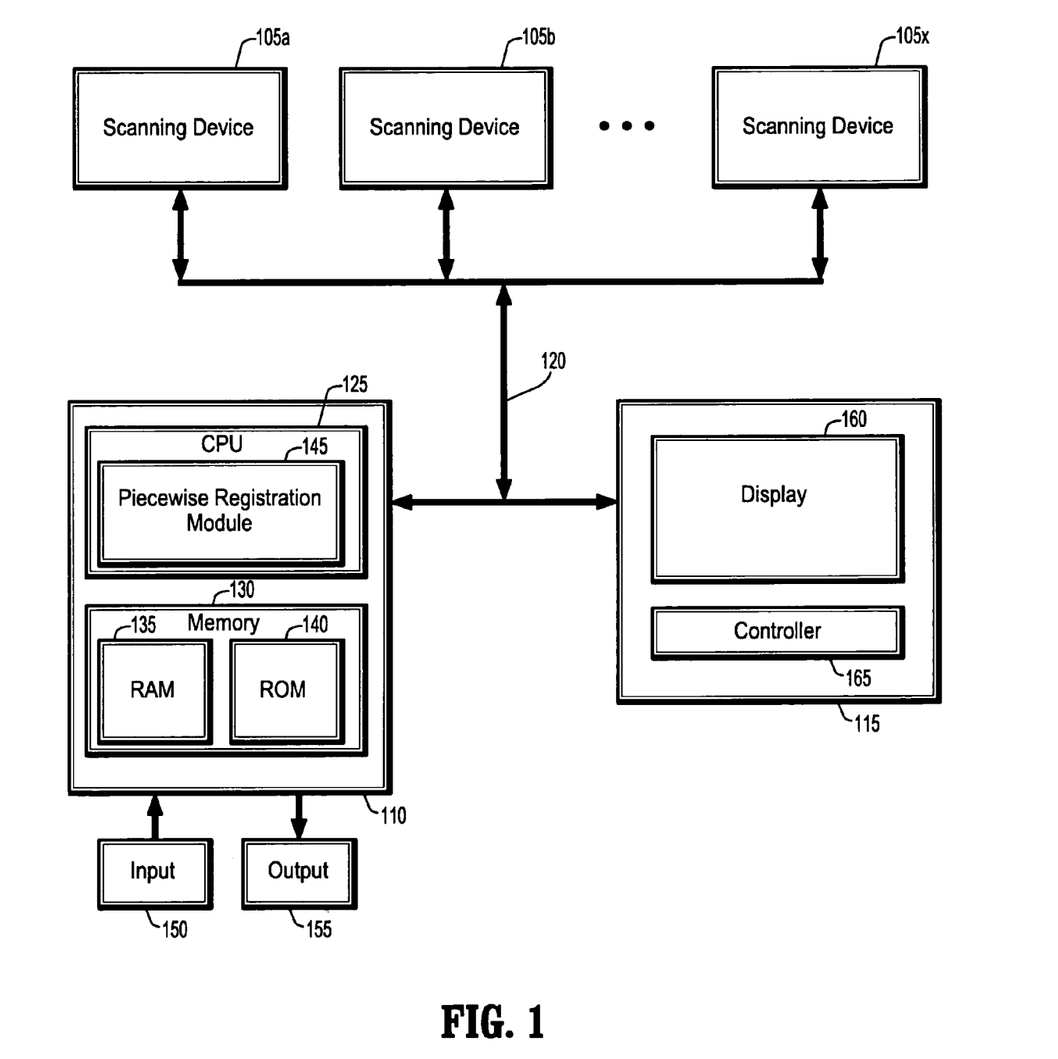
FIG. 1 illustrates a block diagram of a system for piecewise registration of timepoints according to an exemplary embodiment of the present invention.

FIG. 1 is a block diagram of a system 100 for piecewise registration of timepoints according to an embodiment of the present invention. As shown in FIG. 1, the system 100 includes, inter alia, several scanning devices 105a, b . . . x, a computer 110 and an operator's console 115 connected over a wired or wireless network 120. The scanning devices 105a, b . . . x can each be one of an MR imaging device, CT imaging device, helical CT device, PET device, SPECT device, hybrid PET-CT device, hybrid SPECT-CT device, 2D or 3D fluoroscopic imaging device, 2D, 3D, or 4D ultrasound imaging device, or an x-ray device. In addition, one or all of the scanning devices 105a, b . . . x can be a multi-modal or hybrid scanning device that is capable of scanning, for example, in a PET mode, SPECT mode or MR mode.

The computer 110, which can be a portable or laptop computer, etc., includes a CPU 125 and a memory 130, which are connected to an input 150 and an output 155. The CPU 125 includes a piecewise registration module 145 that includes one or more methods for piecewise registration of timepoints as will be discussed hereinafter with reference to FIGS. 3-10. The memory 130 includes a RAM 135 and a ROM 140. The memory 130 can also include a database, CD, DVD, disk drive, etc., or a combination thereof. The RAM 135 functions as a data memory that stores data used during execution of a program in the CPU 125 and is used as a work area. The ROM 140 functions as a program memory for storing a program executed in the CPU 125. The input 150 is constituted by a keyboard, mouse, etc. and the output 155 is constituted by an LCD, CRT display, or printer.

The operation of the system 100 is controlled from the operator's console 115, which includes a controller 165, for example, a keyboard, and a display 160, for example, an LCD or CRT display. The operator's console 115 communicates with the computer 110 and the scanning device 105 so that 2D image data collected by the scanning devices 105a, b . . . x can be rendered into 3D data by the computer 110 and viewed on the display 160. It is to be understood that the computer 110 can be configured to operate and display information provided by the scanning devices 105a, b . . . x absent the operator's console 115, using, for example, the input 150 and output 155 devices to execute certain tasks performed by the controller 165 and display 160.

The operator's console 115 further includes any suitable image rendering system/tool/application that can process digital image data of an acquired image dataset (or portion thereof) to generate and display 2D and/or 3D images on the display 160. More specifically, the image rendering system may be an application that provides 2D/3D rendering and visualization of medical image data, and which executes on a general purpose or specific computer workstation. The computer 110 can also include an image rendering system/tool/application for processing digital image data of an acquired image dataset to generate and display 2D and/or 3D images.

Figure 2:
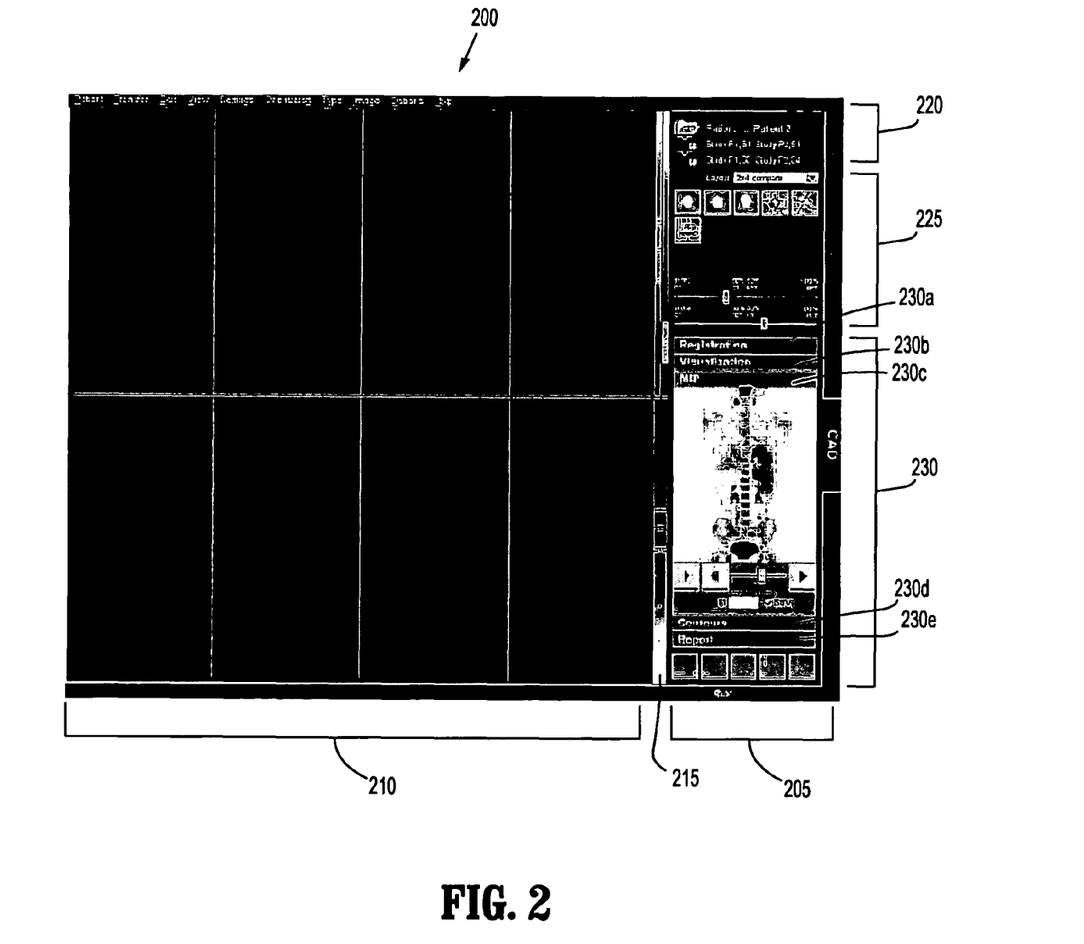
FIG. 2 illustrates a user interface according to an exemplary embodiment of the present invention.

FIG. 2 illustrates a user interface 200 according to an embodiment of the present invention. As shown in FIG. 2, the user interface 200 includes a control area 205, display area 210 and color or blend bars 215. The control area 205 includes items such as a patient folder 220, control icons and buttons 225 and workflow pane 230. The control area 205 is an area where various tools or items are found for operating various applications in accordance with the present invention. The display area 210 is an area where 2D and 3D images are displayed. The color bars 215 are used to set the color distribution of displayed images. The color bars 215 may also include blending sliders for adjusting blend factors or mixing ratios of the displayed images.

The workflow pane 230 includes links to a registration pane 230a, visualization pane 230b, maximum intensity projection (MIP) pane 230c, contour pane 230d and report pane 230e. The links allow a user to perform certain functions provided by each of the panes 230a-e. In addition, the links can be configured such that they perform their functions in a stepwise fashion. For example, the workflow pane 230 sequentially guides the user to first use the registration pane 230a for registering image datasets of a timepoint, then the visualization pane 230b for visualizing the images and so forth.

Figure 3:
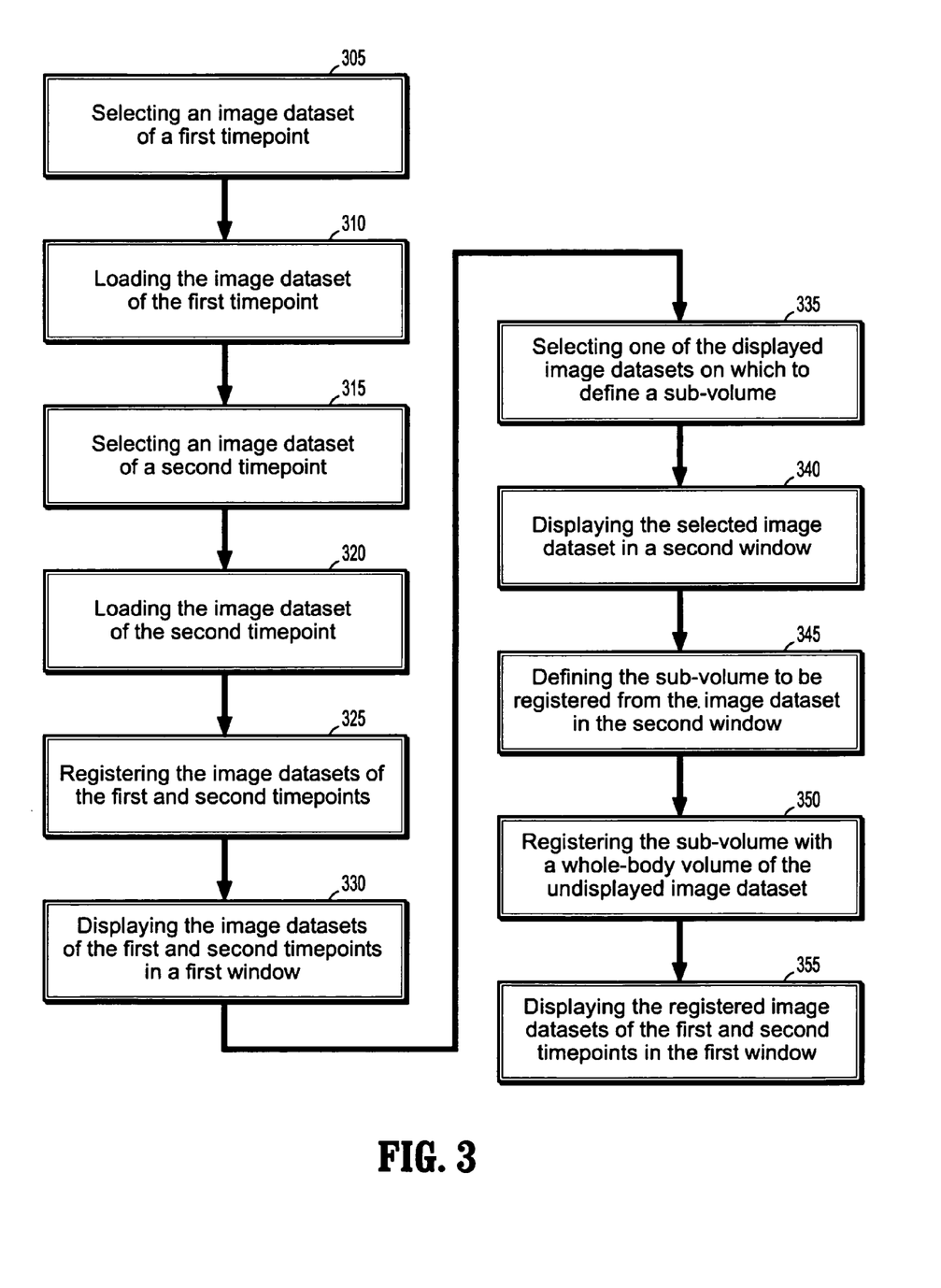
FIG. 3 illustrates a flowchart of a method for piecewise registration of timepoints according to an exemplary embodiment of the present invention.

FIG. 3 is a flowchart illustrating a method for piecewise registration of timepoints according to an embodiment of the present invention. As shown in FIG. 3, an image dataset of a first timepoint is selected by a user via a patient browser 400 of FIG. 4 (305). The first timepoint can include a single image dataset, for example, a single CT series, a single PET series or a single SPECT series. The first timepoint can also include one of the following combinations of image datasets, for example, a combination of a CT and PET series from the same study or from different studies or a combination of a CT and SPECT series from the same study or from different studies. Exemplary dataset combinations for a single timepoint are listed below in Table 1.

TABLE 1

DATASETS OR COMBINATIONS FOR A SINGLE TIMEPOINT

A single CT series
A single PET-AC series
A single PET-NAC series
A single SPECT-AC series
A single SPECT-NAC series
CT series + PET-AC series
CT series + PET-NAC series
CT series + SPECT-AC series
CT series + SPECT-NAC series
A single MR series
MR series + PET-AC series
MR series + PET-NAC series
MR series + SPECT-AC series
MR series + SPECT-NAC series The image datasets of the first timepoint and subsequent timepoints could be from pre-therapy, during-therapy or post-therapy studies. In addition, the same image series can be included as a series in both the first timepoint and subsequent timepoints. For example, in a sample patient hierarchy depicted in FIG. 5, a high-resolution CT series and PET AC series could be combined to form the first timepoint and the high-resolution CT series and a PET NAC series could be combined to form a second timepoint. In other words, a single timepoint could contribute to the first and second timepoints.

Figure 4:
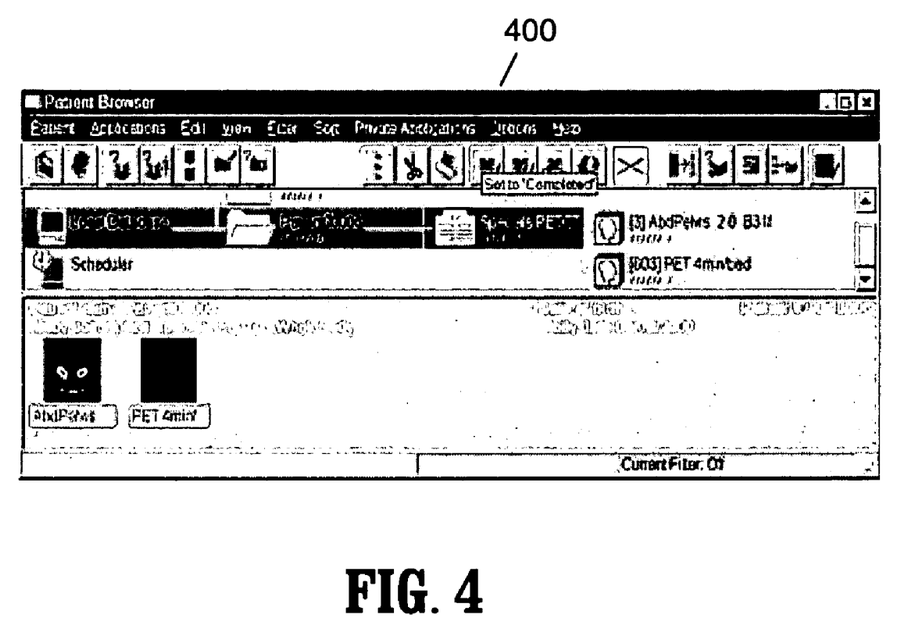
FIG. 4 illustrates a patient browser according to an exemplary embodiment of the present invention.
Figure 5:
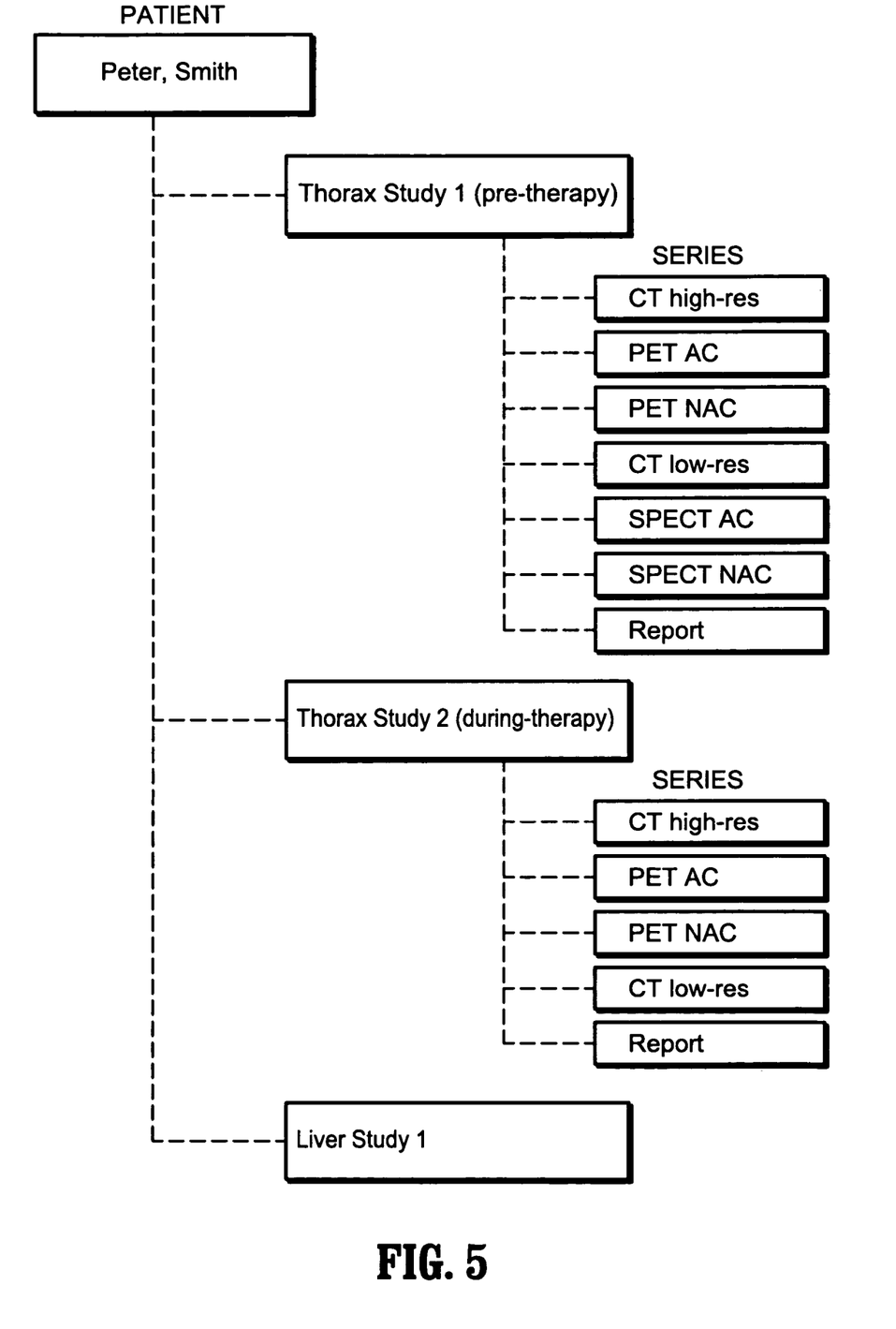
FIG. 5 illustrates a hierarchy chart for creating a timepoint according to an exemplary embodiment of the present invention.
Figure 6:
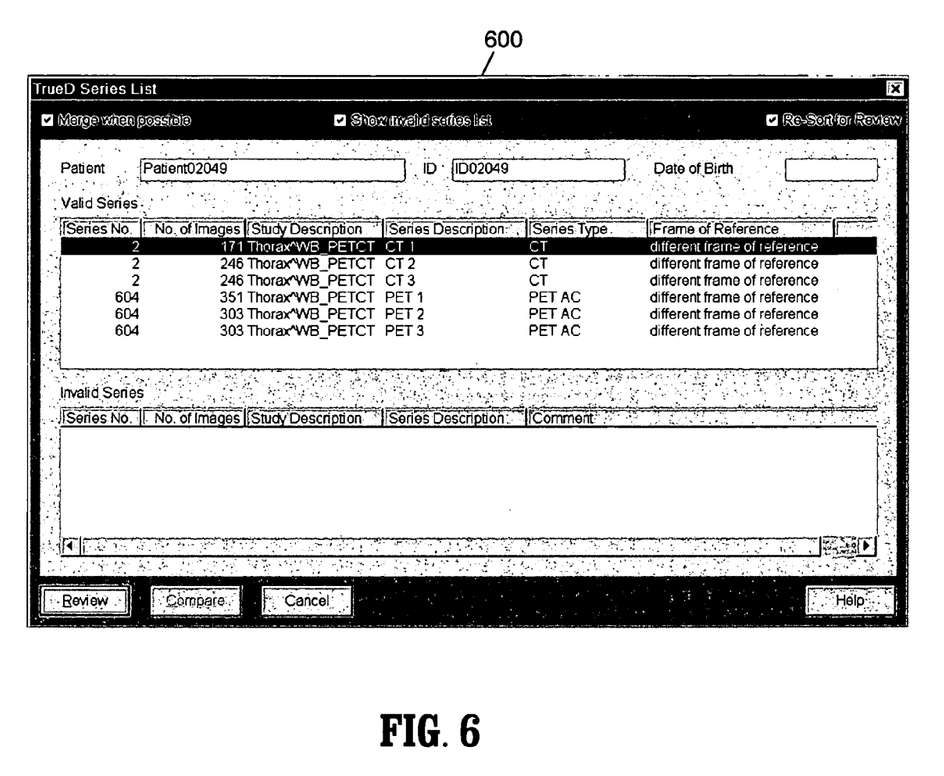
FIG. 6 illustrates a series dialog according to an exemplary embodiment of the present invention.

After selecting the image dataset of the first timepoint, the image dataset is loaded (310). The image dataset can be loaded in one of the following ways: dragging and dropping the selected image dataset from the patient browser 400 onto the display area 210, clicking an extension button on the patient browser or double-clicking relevant data on the patient browser. For example, a user can perform the relevant selection in the patient browser 400 and click a button for loading. The level of selection of the data in the patient browser 400 can be at series, study or at the patient level.

An image series containing unequidistant slices or overlapping slices can also be loaded. In addition, multi-frame images and different types of NM images such as NM RECON TOMO (e.g., a volume as a number of frames within a single image) can be loaded. Further, spiral CT scan data can be loaded. Once such data is loaded it is validated using image header information. In this manner, when studies containing different patient header information for single as well as multiple timepoints are selected for loading, a warning dialog may pop-up to indicate to the user that the patient IDs are different and thus indicate the correct manner for loading an image series. The warning dialog may also be used to prompt the user to modify the patient IDs. After the data is validated, a volume is constructed based on the image series.

Once the image dataset of the first timepoint is loaded, an image dataset of a second timepoint may be selected (315). Similar to selecting the image dataset of the first timepoint, the image dataset of the second timepoint may be selected via the patient browser 400. In addition, the second timepoint may be one of the image series described above for the first timepoint. After selecting the second timepoint for loading, it is loaded (320). The second timepoint is loaded using one of the techniques described above for the loading the first timepoint.

When loading the second timepoint, it is also determined if it is a valid combination of datasets for multiple timepoint loading and then sorted. A list of the valid combinations of datasets for multiple timepoint loading is shown below in Table 2.

TABLE 2

| FIRST TIMEPOINT | SECOND TIMEPOINT |
|---|---|
| PET AC alone or with NAC | PET AC alone or with NAC |
|  | PET AC alone or with NAC + CT |
|  | PET AC alone or with NAC + MR |
|  | SPECT |
| SPECT AC alone or with NAC | SPECT AC alone or with NAC |
|  | SPECT AC alone or with NAC + CT |
|  | SPECT AC alone or with NAC + MR |
|  | PET |
| CT | CT |
|  | CT + PET AC alone or with NAC |
|  | CT + SPECT AC alone or with NAC |
|  | MR |
| MR | MR |
|  | MR + PET AC alone or with NAC |
|  | MR + SPECT AC alone or with NAC |
|  | CT |
| PET AC alone or with NAC + CT | PET AC alone or with NAC |
|  | CT |
|  | PET AC alone or with NAC + CT |
|  | MR |
|  | SPECT |
| SPECT AC alone or with NAC + CT | SPECT AC alone or with NAC |
|  | CT |
|  | SPECT AC alone or with NAC + CT |
|  | MR |
|  | PET |

As shown in Table 2, if for example, a loaded first timepoint contains a SPECT AC dataset alone or with a NAC dataset, any one of the SPECT AC dataset alone or with a NAC dataset from the first timepoint, SPECT AC dataset alone or with the NAC dataset, SPECT AC dataset alone or with an NAC dataset and a CT or MR dataset and a PET dataset can be loaded as the second timepoint. If, however, the second timepoint is not one of the valid combinations of datasets for loading, then a series dialog 600 of FIG. 6 may be displayed indicating valid combinations of datasets for loading to the user. In Table 2, the PET or SPECT AC and NAC datasets are not listed separately because it is assumed that whenever the user selects the PET AC dataset and loads, the PET AC dataset will be displayed. Similarly, when the user selects the PET NAC dataset and loads, the PET NAC dataset will be loaded and displayed along with a CT dataset. The user can then toggle between the PET AC and PET NAC datasets. The same functionality also holds true for the SPECT AC/NAC datasets.

After the image datasets of the first and second timepoints have been loaded, they are registered (325). Registration is the process of aligning medical image data. In other words, it is a procedure used to align two input image series generated by different modalities or by one modality at different times. During registration, one of the datasets can be fixed, e.g., in an unchanged position, and the other data set can be transformed, e.g., translated, rotated and scaled to align the two datasets. The fixed dataset may also be referred to as a reference volume and the dataset to be transformed may be referred to as a model volume. Thus, a geometrical transformation is performed for the model volume to match the anatomy of the reference volume.

To initiate the registration process, the user may click on one of the panes found in the workflow pane 230 of the user interface 200. For example, the user may click on the registration pane 230a, an example of which is shown by pane 700 of FIG. 7. The registration pane 700 includes a set of controls associated with different registration techniques for use with the present invention. For example, the user may select an auto registration button 710 to initiate an automatic registration. In addition, the user may select a visualize button 720 to initiate a visual alignment or the user may select a piecewise registration button 730 to initiate piecewise registration. In this step, an automatic whole-body registration is preformed. It is to be understood that prior to initiating automatic registration the user could perform a visual alignment to improve the performance of the automatic registration.

Automatic registration is a fully automated matching algorithm based on mutual information or normalized mutual information. Automatic registration can be performed, for example, by: registering a first image series with a second image series of an image dataset of a first timepoint; registering a first image series with a second image series of an image dataset of a second timepoint; and registering the first image series of the first timepoint with the first image series of the second timepoint and the second image series of the first timepoint with the second image series of the second timepoint.

For example, when two CT-PET scans are loaded, registration of the CT-PET scans begins for both first and second timepoints in sequence. Once the CT-PET registrations are completed, a registration is initiated to match the two CT studies across the first and second timepoints. When the automatic registration takes place, the progress of the registration can be visualized in alpha blended images (e.g., fused images). A progress text may also be displayed indicating the progress of the registration.

It is to be understood that although the above-mentioned registration technique has been described as being based on mutual information, any registration technique, including those not based on mutual information may be used in accordance with the present invention. For example, a non-rigid registration may be used when performing the piecewise registration.

It is to be understood that although the image datasets of the first and second timepoints have been described as being registered after they have been loaded, in other words, automatic registration is disabled, automatic registration could be enabled such that registration can automatically take place after the image dataset of the first timepoint has been loaded and again after the image dataset of the second timepoint has been loaded. For example, when a user loads an image dataset of a first timepoint including a CT image series and a PET image series, once loaded, the CT and PET image series can be automatically registered. Similarly, when the user loads an image dataset of a second timepoint including a CT image series and a PET image series, once loaded, the CT and PET image series can be automatically registered. When completed, the image datasets of the first and second timepoints are then automatically registered across timepoints as described in step 325.

Once the image datasets of the first and second timepoints have been loaded and registered, they are displayed (330). In particular, the image datasets are displayed on the display area 210 of the user interface 200 so that they may be compared to each other thereby enabling, for example, the user to diagnose medical conditions or analyze response to therapy.

It is to be understood that each of the image datasets of the first and second timepoints could be displayed as soon as it is loaded. In addition, portions of the image datasets of the first and second timepoints could be displayed as they are being registered.

When reviewing the image datasets, if the user recognizes that individual organs such as the liver are not aligned properly across timepoints, for example, due to different levels of inspiration, the user can improve the alignment of a sub-volume that is of interest by performing a visual alignment, by unlinking the timepoints then paging up or down either timepoint until there is a good fit of the datasets or by performing a piecewise registration. In other words, a local volume registration of an organ-specific nature will be performed.

When performing local volume registration, an organ such a lung, liver, kidney, heart or brain can be matched to a whole-body. For example, a sub-volume can be defined around a liver of a first timepoint and registered with a whole-body dataset of a second timepoint and a sub-volume can be defined around a lung of the first timepoint and registered with the whole-body dataset of the second timepoint. Results of this matching can then be stored. It is to be understood that prior to initiating piecewise registration the user could perform a visual alignment to improve the performance of a subsequent automatic registration. Piecewise registration will now be discussed in more detail.

To initiate the piecewise registration, the user selects one of the displayed image datasets on which to define the sub-volume (335). This can be accomplished by using mouse and/or keyboard cursor buttons to select the desired image. Once completed, the piecewise registration button 730 on the registration pane 700 is selected. This causes the selected image to be displayed in the MIP pane 230c an example of which is shown by pane 820 of a user interface 800 of FIG. 8 (340). It is to be understood that if the user did not select an image on which to define the sub-volume, a currently active timepoint (e.g., a reference series) would be displayed in the MIP pane.

Figure 9:
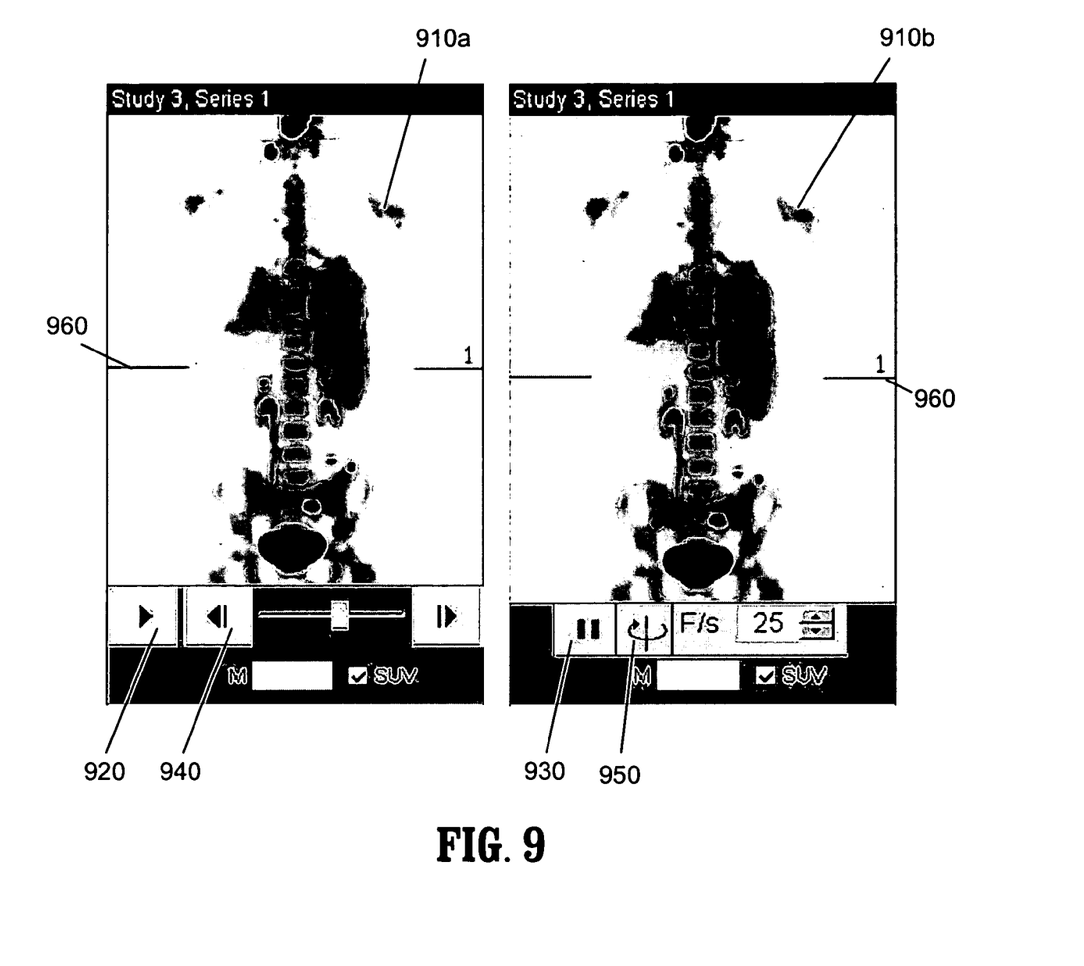
FIG. 9 illustrates a pair of MIPs according to an exemplary embodiment of the present invention.

For exemplary purposes, a pair of rotating MIPs 910a and 910b of a loaded PET dataset are shown in FIG. 9. In FIG. 9, a MIP algorithm is used to create the rotating MIPs 910a and 910b by calculating a parallel projection of the loaded volume and visualizing maximum values of the volume. MIP 910a is a snapshot of the rotating MIP when it is played and MIP 910b is a snapshot of the rotating MIP when it is paused. The MIPs 910a and 910b can be rotated by clicking a play button 920 or paused by clicking a pause button 930. The MIPs 910a and 910b may further be manipulated or controlled by clicking on various control buttons such as a previous frame button 940 or clockwise/anti-clockwise rotate button 950.

As further shown in FIG. 9, a reference line 960 is included in each of the MIPs 910a and 910b. The reference line 960 indicates the position and orientation of a cut plane. For volume filters, the reference line 960 indicates the orientation of the viewing plane. The reference line 960 may be coordinated with images displayed in the various areas of, for example, a display area 810 of FIG. 8. Thus, on each image in the display area 810, the position of the reference line 960 is indicated with another reference line. This enables the user to know in the MIP 910a or 910b the location of a lesion identified in a certain area of the display area 810. In addition to coordinated reference lines, cursors may also be coordinated or correlated across timepoints. Thus, cursors may be used to point to the same position on image slices of a different modality of the same study or of different studies.

Figure 10:
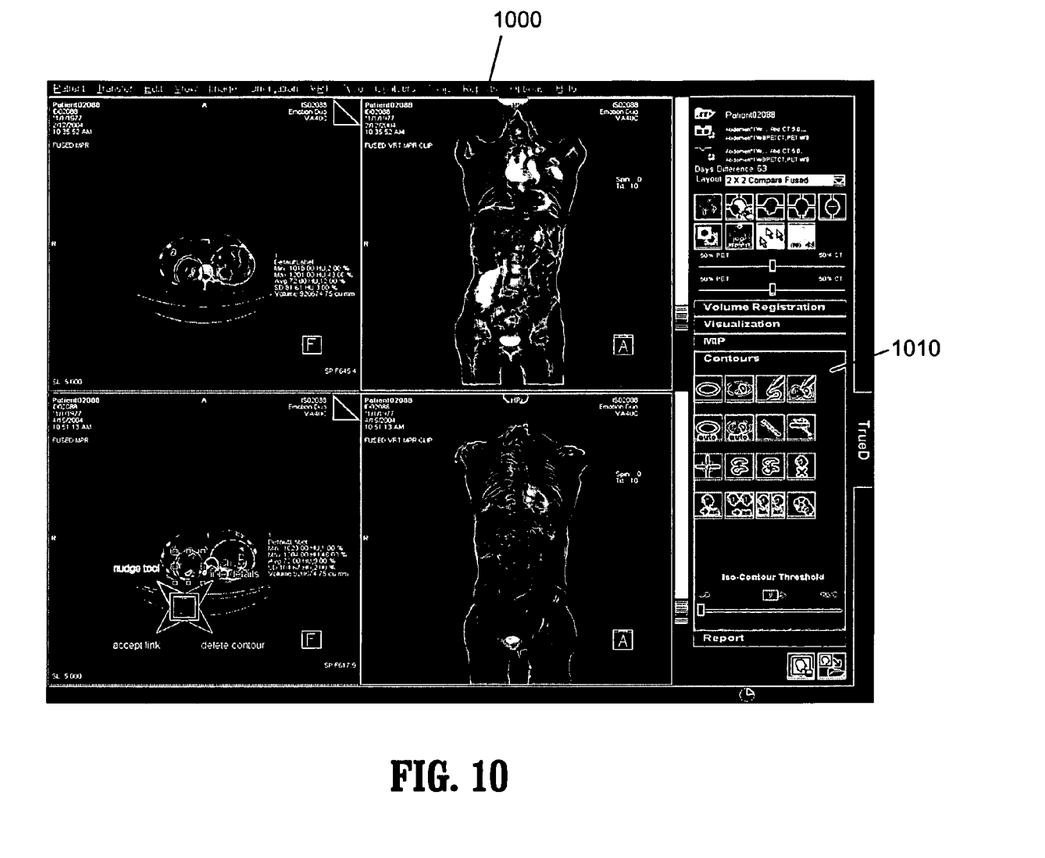
FIG. 10 illustrates a user interface having an active volume definition pane according to an exemplary embodiment of the present invention.

Using a volume definition box, for example, a contours pane 1010 of a user interface 1000 in FIG. 10, the user defines the sub-volume on the MIP (345). This can be done, for example, by selecting a tool such as an ellipse tool for creating ellipsoidal objects or a free-form iso-contour tool for creating isometric objects from the contour pane 1010. The tool may then be used to draw a boundary around, for example, an organ or lesion in the image displayed in the MIP. It is to be understood that the sub-volume is formed by taking the 2D contours drawn around the organ and converting them into a 3D irregular solid representing the organ in the volume. The 3D sub-volume is used to show the contours of the sub-volume.

Figure 7:
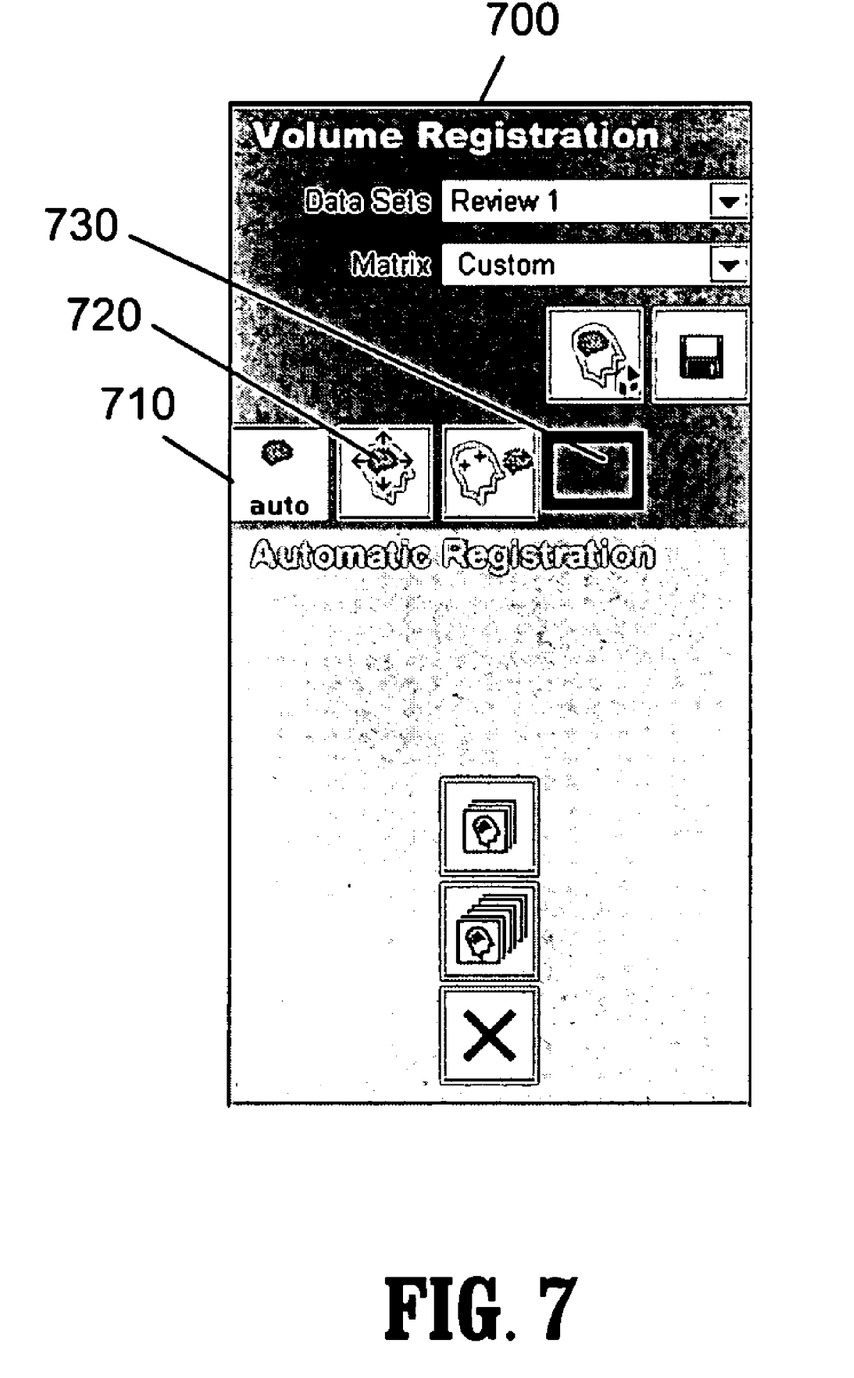
FIG. 7 illustrates a registration pane according to an exemplary embodiment of the present invention.
Figure 8:
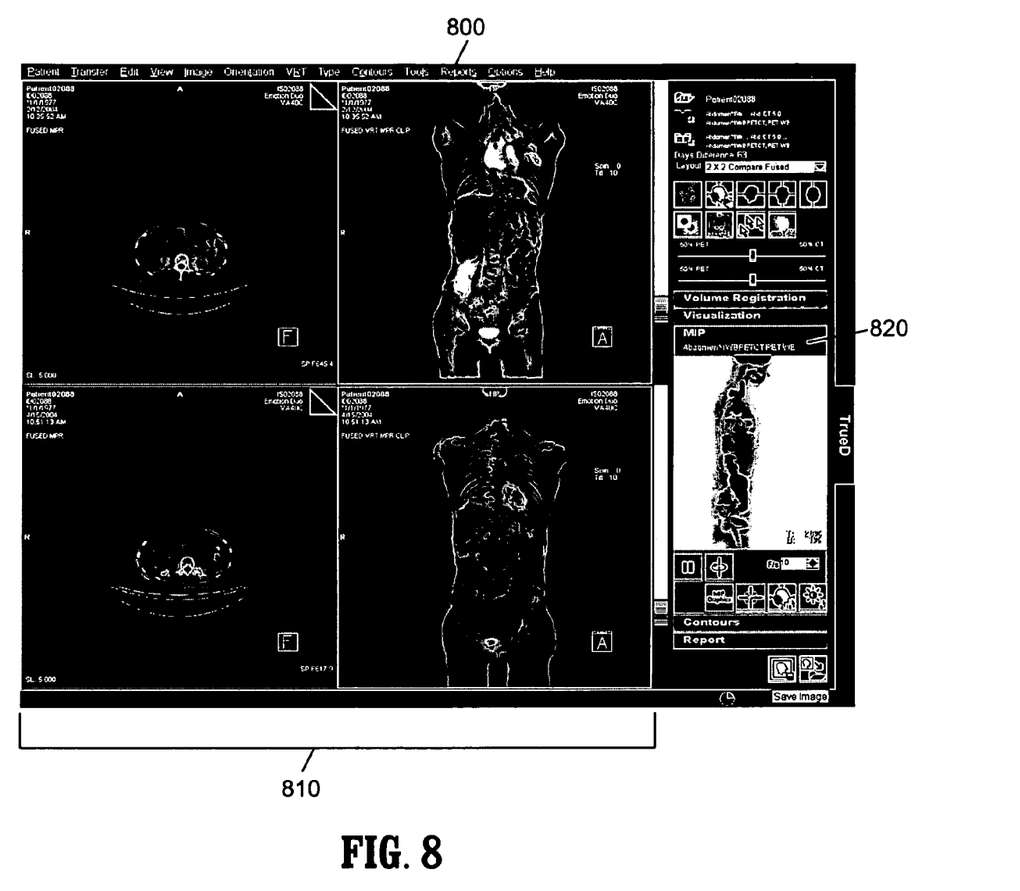
FIG. 8 illustrates a user interface having an active maximum intensity projection (MIP) pane according to an exemplary embodiment of the present invention.

After the sub-volume is defined, the user selects the automatic registration button 710 of the registration pane 700 and the sub-volume is automatically registered with a whole-body volume of the undisplayed image dataset (350). This is accomplished, for example, by: registering a whole-volume including the sub-volume of a first image series with a whole-volume of a second image series of the selected image dataset; registering a whole-volume of a first image series with a whole-volume of a second image series of the unselected image dataset; and registering the whole-volume including the sub-volume of the first image series of the selected image dataset with the whole-volume of the first image series of the unselected image dataset and the whole-volume of the second image series of the selected image dataset with the whole-volume of the second image series of the unselected image dataset. Once registered, the images in the model series are updated and the image datasets of the first and second timepoints are displayed, for example, on the display area 210 of the user interface 200 (355).

In accordance with an exemplary embodiment of the present invention, a sub-volume from one image series can be matched with a whole-body volume of another series. For example, in accordance with the present invention, a user can define a sub-volume such as a lung region in a PET series to be registered with a whole-body volume of a CT series, thereby enabling enhanced comparisons between CT-CT since levels of inspiration are generally different across timepoints.

It is to be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture. It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention. It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A system for piecewise registration, comprising:
   a tangible memory device for storing a program; and
   a processor in communication with the memory device, the processor operative with the program to:
   acquire a first image dataset at a first time and a second image dataset at a second time, wherein the first and second image datasets each comprise same patient anatomy;
   receive a selection of the first and second image datasets,
   perform a first registration the first and second image datasets with each other;
   display the registered first and second image datasets;
   receive an input defining a sub-volume around an anatomical structure in the first image dataset that is not properly aligned with a corresponding anatomical structure in the displayed second image dataset; and
   align the anatomical structure in the first image dataset with the corresponding anatomical structure in the second image dataset by performing a second registration by registering the sub-volume with a whole-body volume of the second image dataset.

2. The system of claim 1, wherein acquiring the first and second image datasets comprises acquiring the first and second image datasets from at least one imaging source selected from: a computed tomography (CT) scanner, positron emission tomography (PET) scanner, single photon emission computed tomography (SPECT) scanner, magnetic resonance (MR) imager or ultrasound device.

3. The system of claim 2, wherein the first and second image datasets each comprise images acquired from at least two different imaging sources.

4. The system of claim 1, wherein the processor is further operative with the program to:
   load the first and second image datasets onto a display area of a monitor.

5. The system of claim 4, wherein when loading the first and second image datasets the processor is further operative with the program to:
   receive a selection of the first and second image datasets; and
   construct whole-body volumes from the first and second image datasets, respectively.

6. The system of claim 1, wherein performing a first registration further comprises registering the first and second image datasets the processor is further operative with the program to:
   register a first image series of the first image dataset with a second image series of the first image dataset;
   register a first image series of the second image dataset with a second image series of the second image dataset; and
   register the first image series of the first image dataset with the first image series of the second image dataset and the second image series of the first image dataset with the second image series of the second image dataset.

7. The system of 1, wherein the processor is further operative with the program to:
display the first and second image datasets prior to the first registration of the first and second image datasets.

8. The system of claim 1, wherein when performing the second registration by registering the sub-volume and with the whole-body volume of the second image dataset the processor is further operative with the program to:
register a whole-body volume including the sub-volume of a first image series of the first image dataset with a whole-body volume of a second image series of the first image dataset;
register a whole-body volume of a first image series of the second image dataset with a whole-body volume of a second image series of the second image dataset; and
register the whole-body volume including the sub-volume of the first image series of the first image dataset with the whole-body volume of the first image series of the second image dataset and the whole-body volume of the second image series of the first image dataset with the whole-body volume of the second image series of the second image dataset.

9. The system of claim 1, wherein the processor is further operative with the program code to:
display the anatomical structure in the first image dataset aligned with the corresponding anatomical structure in the second image dataset.

10. A computer program product comprising a non-transitory computer useable medium having computer program logic recorded thereon for piecewise registration, the computer program logic comprising:
program code for selecting a first image dataset acquired at a first time and a second image dataset acquired at a second time, wherein the first and second image datasets each comprise same patient anatomy;
program code for performing a first registration by registering the first and second image datasets with each other;
program code for displaying the registered first and second image datasets;
program code for defining a sub-volume around an anatomical structure in the displayed first image dataset that is not properly aligned with a corresponding anatomical structure in the displayed second image dataset; and
program code for aligning the anatomical structure in the first image dataset with the corresponding anatomical structure in the second image dataset by performing a second registration by registering the sub-volume with a whole-body volume of the second image dataset.

11. The computer program product of claim 10, wherein the sub-volume is an organ.

12. The computer program product of claim 10, wherein the program code for performing the second registration by registering the sub-volume with a whole-body volume of the second image dataset comprises:
program code for registering the sub-volume of a first image series of the first image dataset with a whole-body volume of a second image series of the first image dataset;
program code for registering a whole-body volume of a first image series of the second image dataset with a whole-body volume of a second image series of the second image dataset; and
program code for registering the sub-volume of the first image series of the first image dataset with the whole-body volume of the first image series of the second image dataset and the whole-body volume of the second image series of the first image dataset with the whole-body volume of the second image series of the second image dataset.

13. A computer system, comprising:
a processor;
a display; and
a program storage device readable by the computer system, embodying a program of instructions executable by the processor to perform method steps for piecewise registration, comprising:
acquiring a first image dataset at a first time and a second image dataset at a second time, wherein the first and second image datasets each comprise same patient anatomy;
selecting the first and second image datasets;
performing a first registration of the first and second image datasets with each other;
displaying the registered first and second image datasets on the display;
defining a sub-volume around an anatomical structure in the displayed first image dataset that is not properly aligned with a corresponding anatomical structure in the displayed second image dataset; and
aligning the anatomical structure in the first image dataset with the corresponding anatomical structure in the second image dataset by performing a second registration, the second registration comprising registering the sub-volume with a whole-body volume of the second image dataset.

14. The system of claim 13, wherein acquiring first and second image datasets further comprises acquiring the first and second image datasets from at least one imaging source selected from: a computed tomography (CT) scanner, positron emission tomography (PET) scanner, single photon emission computed tomography (SPECT) seamier, magnetic resonance (MR) imager, and ultrasound scanner.

15. The system of claim 14, wherein the first and second image datasets each comprise images acquired from at least two different imaging sources.

16. The system of claim 15, wherein the images acquired from at least two different imaging sources are selected from: CT image series and MR image series, a PET image series and SPECT image series, a CT and PET image series, an MR and PET image series, a CT and SPECT image series, an MR and SPECT image series, and an MR and an ultrasound image series.

17. The system of claim 13, the method further comprising:
displaying the first and second image datasets; and
constructing whole-body volumes from the first and second image datasets, respectively.

18. The system of claim 13, wherein registering the first and second image datasets comprises:
registering a first image series of the first image dataset with a second image series of the first image dataset;
registering a first image series of the second image dataset with a second image series of the second image dataset; and
registering the first image series of the first image dataset with the first image series of the second image dataset and the second image series of the first image dataset with the second image series of the second image dataset.

19. The system of claim 13, further comprising:
displaying the first and second image datasets prior to performing a first registration.

20. The system of claim 19, wherein the first and second image datasets are automatically or manually selected for registration.

21. The system of claim 13, further comprising a user input device for receiving manual definition of the sub-volume.

22. The system of claim 13, wherein performing a second registration comprises:
   registering a whole-body volume including the sub-volume of a first image series of the first image dataset with a whole-body volume of a second image series of the second image dataset;
   registering a whole-body volume of a first image series of the second image dataset with a whole-body volume of a second image series of the second image dataset; and
   registering the whole-body volume including the sub-volume of the first image series of the first image dataset with the whole-body volume of the first image series of the second image dataset and the whole-body volume of the second image series of the first image dataset with the whole-body volume of the second image series of the second image dataset.

23. The system of claim 13 further comprising:
   displaying the anatomical structure in the first image dataset aligned with the corresponding anatomical structure in the second image dataset.

* * * * *